United States Patent
Mo et al.

[19]
[11] Patent Number: 6,052,588
[45] Date of Patent: Apr. 18, 2000

[54] METHOD FOR ARCHIVING AND RETRIEVING TELEMETRY IN A SATELLITE CONTROL CENTER

[75] Inventors: Hee Sook Mo; Won Chan Jung; Kyung Sin Kim, all of Daejon-shi, Rep. of Korea

[73] Assignee: Electronics and Telecommunications Research Institute, Taejon-Shi, Rep. of Korea

[21] Appl. No.: 08/951,599

[22] Filed: Oct. 16, 1997

[30]    Foreign Application Priority Data

Oct. 17, 1996 [KR]   Rep. of Korea ..................... 96-46458

[51] Int. Cl.[7] .................................................. H04B 7/185
[52] U.S. Cl. ........................... 455/430; 455/12.1; 701/13
[58] Field of Search ................................ 455/12.1, 13.2, 455/427, 430; 701/13; 710/33

[56]             References Cited

U.S. PATENT DOCUMENTS

| | | | |
|---|---|---|---|
| 5,187,805 | 2/1993 | Bertiger et al. | 455/12.1 |
| 5,758,261 | 5/1998 | Wiedeman | 455/13.1 |
| 5,774,287 | 6/1998 | Leonhardt et al. | 710/33 |
| 5,802,445 | 9/1998 | Wiedeman et al. | 455/12.1 |

OTHER PUBLICATIONS

Ross M. Cox, Long Term Trending of Engineering Data for the Hubble Space Telescope, Nov. 16–20, 1992, pp. 727–732.

*Primary Examiner*—Paul Loomis
*Attorney, Agent, or Firm*—Cohen, Pontani, Lieberman & Pavane

[57]             ABSTRACT

A method for storing and retrieving telemetry which can reduce the size of a data storage tape and the time for retrieving data by overcoming the problems in a conventional satellite control system wherein all telemetry received from a satellite are stored without being subject to a filtering operation in a hard disk or memory of a computer for a predetermined time, and when needs arise for replaying previously stored data, a tape which stores required data is first located and mounted on a driver in order to load the required data. In accordance with the method of the present invention, data is filtered with respect to a variation of each telemetry. The data is stored step by step according to the period for which data should be stored. The data which should be stored for a long term is compressed and stored as an average value, maximum value, minimum value and variance of daily data. The generation and storage of long term data are offline processed. A data storage catalog is generated and stored into a data storage device. Thus, according to the present invention, the capacity of the data storage device and the retrieval time for replay can be reduced.

6 Claims, 4 Drawing Sheets

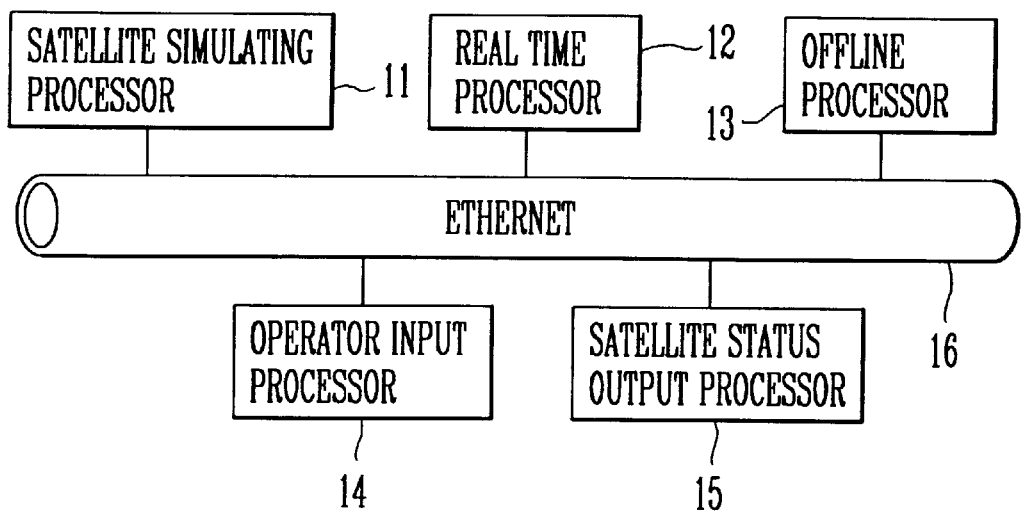
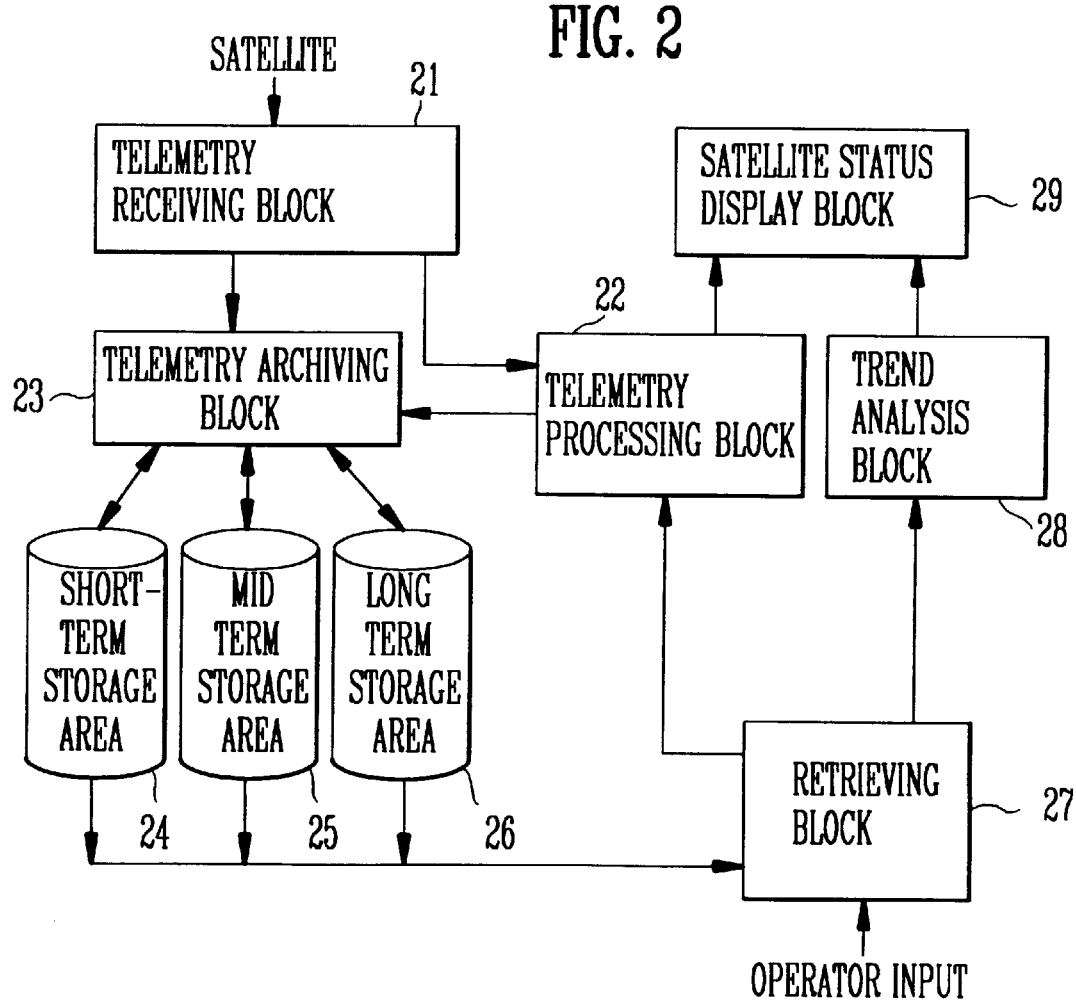

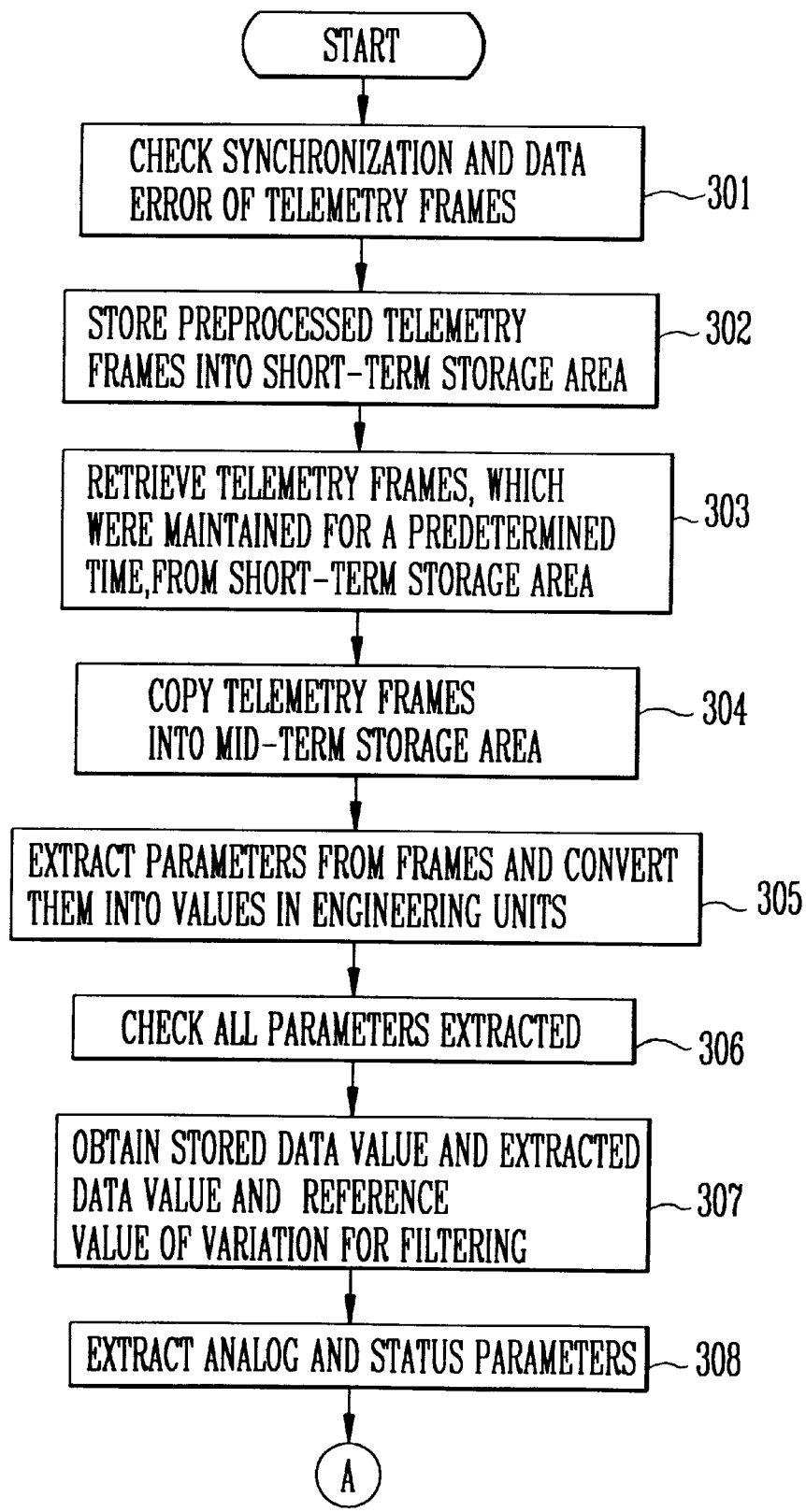

METHOD FOR ARCHIVING AND RETRIEVING TELEMETRY IN A SATELLITE CONTROL CENTER

BACKGROUND OF THE INVENTION

1. Field of the Invention

The present invention relates to a satellite control system, and more particularly, to a method for storing and retrieving telemetry in a satellite control center.

2. Description of the Related Art

Typically, a satellite control center needs to store and maintain telemetry received from a satellite along with reception time thereof in order to replay telemetry frames and to analyze the trend of data on the status of the satellite. In a conventional satellite control system, all telemetry received from a satellite are stored without being subject to a filtering operation in a hard disk or memory of a computer for a predetermined time, and afterwards are kept in a magnetic tape for permanent storage. When needs arise for replaying previously stored data to analyze the trend and status of a satellite, a tape which stores required data is first located and mounted on a driver in order to load the required data. The series of steps are performed manually by a human operator, and the size of a storage tape should be large enough to store all data received from a satellite. Moreover, a tape mounting time required for obtaining data to be processed from a storage device, time for loading disk, time for retrieving data files, and time for loading data into a memory increase enormously as data is accumulated.

SUMMARY OF THE INVENTION

It is therefore an object of the present invention to provide a method for archiving and retrieving data which can reduce a data storage capacity while minimizing the loss of telemetry data, thus reducing the time for retrieving data.

In accordance with one aspect of the present invention, a method for storing telemetry in a satellite control system is provided which comprises the steps of checking frame synchronization and data error in telemetry frames received from a satellite, tagging the time when the frames were received, and transmitting the received telemetry frames to a telemetry archiving block, at a telemetry frame receiving block; storing in real time the telemetry frames received at the telemetry archiving block into a short-term storage area by a short-term storage process; retrieving telemetry frames, which were maintained for a predetermined time, from the telemetry frames stored in the short-term storage area, at a mid-term storage process; copying the retrieved telemetry frames into a mid-term storage area at the mid-term storage process and calling a remotely sensed data processing block; extracting parameters used for analyzing a trend of data from the telemetry frames and converting them into values in engineering units, at the telemetry processing block; checking the extracted parameters; obtaining a data value of the lastly stored parameter and an extracted data value to be presently processed in accordance with the result of said checking step, and setting a reference value of variation for filtering; extracting analog and status parameters by comparing the data value of the parameter, the extracted data value, and the reference value of variation, and transmitting them to the mid-term storage process in the telemetry archiving block; forming records of a frame from the received extracted parameters, storing them into the mid-term storage area, and then modifying data values in a parameter table, at the mid-term storage process; deleting data and telemetry frames stored in the short-term storage area and modifying a catalog in the mid-term storage area, at the mid-term storage process which modified the data values in the parameter table; retrieving telemetry frames, which were maintained for a predetermined time, from the telemetry frames stored in the mid-term storage area, at a long-term storage process; copying the retrieved telemetry frames into a long-term storage area; retrieving analog parameters in engineering units from the copied telemetry frames and calculating an average value, maximum value, minimum value and variance of daily data; storing the calculated average value, maximum value, minimum value and variance of parameters into the long-term storage area; and deleting the frames and data which were copied into the mid-term storage area and modifying the catalogues of the mid-term storage area and the long-term storage area, at the long-term storage process which stored the calculated parameter values into the long-term storage area.

In accordance with another aspect of the present invention, a method for retrieving telemetry data in a satellite control center is provided which comprises the steps of checking the validity of data input from an operator at a retrieving block which received a processing pattern of data to be processed, start and stop time, and a parameter identification to be processed from the operator; retrieving information on where the data to be processed is stored with respect to the start time by using information in a catalog, at the retrieving block which checked the validity of data input from the operator; extracting a storage area and file index of data by using the information in the catalog; opening a memory of the extracted file and loading data; checking a processing pattern of the loaded data; transmitting data to a trend analysis processing block if it is found at said checking step that the loaded data is data for trend analysis of data; generating necessary data values according to the scale factor of the data to be displayed by using a linear interpolation and transmitting them to a satellite status display block, at the trend analysis processing block which received the data for analyzing a trend of data; transmitting the loaded data to a telemetry processing block if it is found at said checking step that the processing pattern is a replay of original data or simple data processing; transmitting the processed data to the satellite status display block; and displaying the status of the analyzed data according to a defined display pattern at the satellite status display block which received the processed data.

In accordance with the method for compressing, storing and retrieving telemetry data in a satellite control system of the present invention, the storage capacity of data storage devices can be reduced without the loss of data by filtering the stored data, unlike the conventional method for storing telemetry data. As a result, the time for retrieving stored data for replay can be reduced by 80% compared with the conventional method which stores all data, and the variance of retrieval time can also be reduced.

BRIEF DESCRIPTION OF THE DRAWINGS

The present invention will become more apparent upon a detailed description of the preferred embodiments for carrying out the invention as rendered below. In the description to follow, references will be made to the accompanying drawings, where like reference numerals are used to identify like or similar elements in the various drawings and in which:

FIG. 1 is a block diagram illustrating a hardware configuration of a system for storing and retrieving telemetry received from a satellite in accordance with the present invention;

FIG. 2 is a flow diagram of process blocks executed for storing and retrieving telemetry in a satellite control system in accordance with the present invention;

FIGS. 3A and 3B represent a flow chart illustrating the steps for storing and retrieving telemetry data in a satellite control system in accordance with the present invention.

DETAILED DESCRIPTION OF THE INVENTION

Figure 3B:
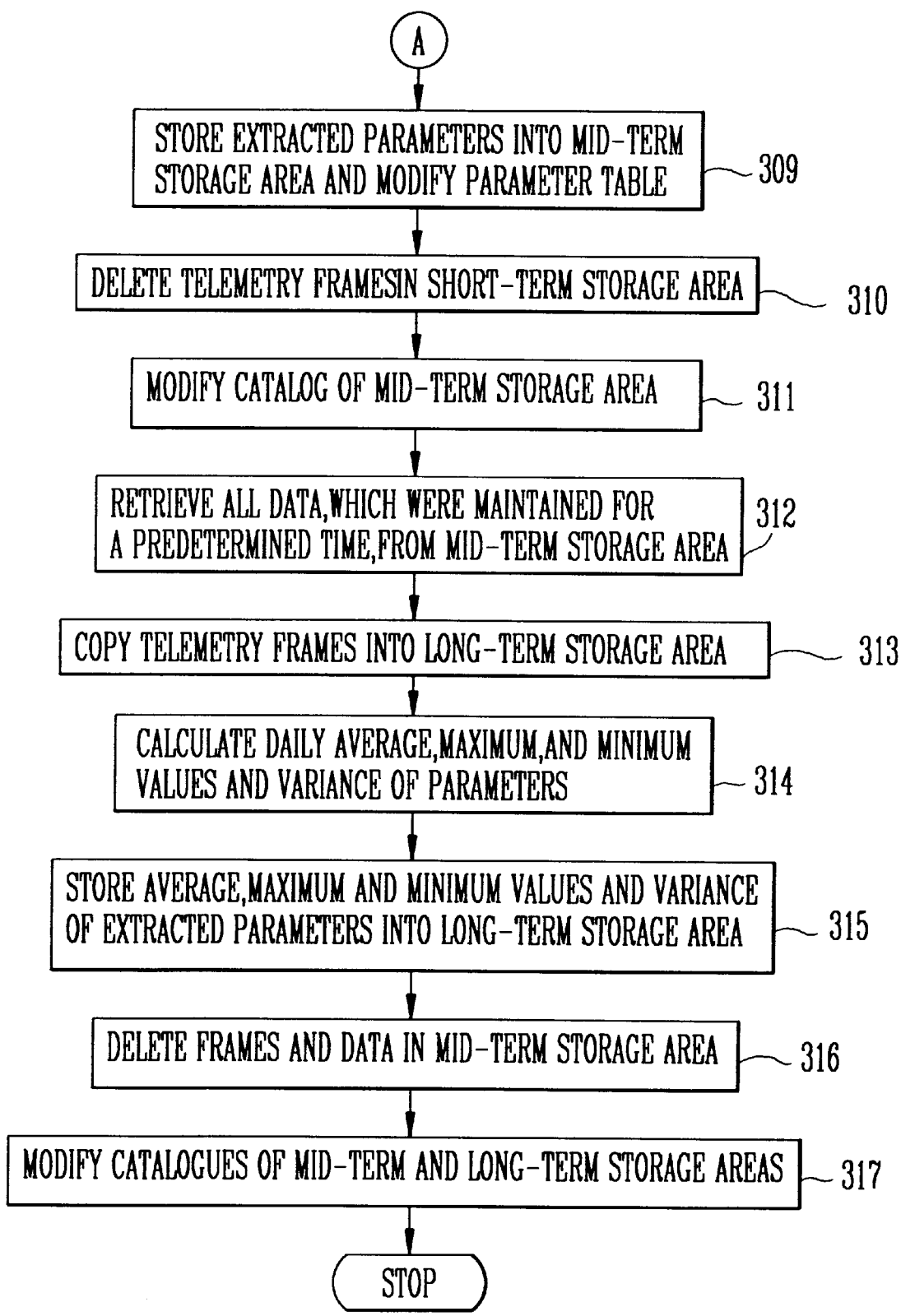

Referring now to FIG. 1, there is shown a block diagram illustrating a hardware configuration of a system for storing and retrieving telemetry received from a satellite in accordance with the present invention. The system comprises a satellite simulating processor 11 for simulating a satellite by software, a real time processor 12 for receiving telemetry data from a satellite and transmitting a remote command, an offline processor 13 for analyzing data on the flight mechanism of the satellite and the trend of data on the status of the satellite by using data previously stored for a predetermined time, an operator input processor 14 for requesting a trend analysis and storage of the telemetry data and, if necessary, generating/executing the remote command to be directed to the satellite, and a satellite status output processor 15 for displaying the status of the satellite. These processors are linked to each other via Ethernet 16 to transmit and receive data.

FIG. 2 is a flow diagram of process blocks executed for storing and retrieving telemetry in a satellite control system in accordance with the present invention. Upon receiving a telemetry frame from the satellite, a telemetry receiving block 21 checks the synchronization of the frame and error in the data. All telemetry frames received from the satellite are transmitted to a telemetry achiving block 23 for subsequent replay, and valid telemetry frames are transmitted to a telemetry processing block 22 for data processing. The telemetry processing block 22 extracts parameters from the received telemetry frames and converts the extracted parameters into values in engineering units. The parameters converted into values in engineering units are transmitted to a satellite status display block 29 for display. The telemetry archiving block 23 includes a short-term storage processor (not shown), a mid-term storage processor (not shown), and a long-term storage processor (not shown). The telemetry archiving block 23 stores the received telemetry frames in a short-term storage area 24 in real time by a short-term storage process (not shown) and copies the telemetry frames, which were maintained for a predetermined time, into a mid-term storage area 25 by a mid-term storage process (not shown). The data stored in the mid-term storage area 25 for a predetermined time is copied into a long-term storage area 26 by a long-term storage process (not shown) for permanent storage. The short-term storage area 24 stores original telemetry frames, reception time of the frames in a ground control system, and frame check status. The mid-term storage area 25 stores original telemetry frames, which were maintained for a predetermined time, and parameters which were converted into values in engineering units. The long-term storage area 26 stores original telemetry frames, which were maintained in the mid-term storage area 25 for a predetermined time, and parameters which were converted into values in engineering units. The long-term storage area 26 may store these frames and parameters in a compressed form. Upon receiving a request for replaying data stored within a specific interval, a retrieving block 27 loads necessary data by using the storage area and file index of the data to be processed. A trend analysis block 28 displays the trend of variation of the retrieved data in a graphic form or diagram based on the parameters in engineering units. A satellite status display block 29 displays the status of the satellite in a graphic or alphanumeric form in real time.

FIGS. 3A and 3B represent a flow chart illustrating the steps for storing and retrieving telemetry data in a satellite control system in accordance with the present invention. The archiving of telemetry data is performed for two purposes. The first of these two purposes is to allow for subsequent replay of telemetry frames, and the second is to analyze the trend of the particular data on the status of a satellite. Depending on the specific purpose, the form in which data is stored, and duration for which data is stored vary. The data to be subject to subsequent replaying is stored in a bit stream form, and the data to be subject to a trend analysis is first converted into values in engineering units and then stored. From the experiences acquired through the operation of the satellite, it is readily appreciated that the data required for replay and trend analysis by the operator is concentrated on data within a certain period of time or specific data. As a result, data storage is performed in a step by step manner to reduce the time for retrieving data. The most recent data resides in a memory, and the next data is maintained in a disk. After being maintained in the system for a predetermined time, data is stored in an external storage area for permanent storage. Alternately, only the data which is crucial to the analysis of the status of the satellite may be stored. The data which is not stored can be processed through the replay of the original frames.

The storage of telemetry data is performed only for original remotely sensed frames to be replayed. Frame synchronization and data error are checked and the reception time of frames is tagged at the remotely sensed frame receiving block 21 at step 301. The stored frames are transmitted to the telemetry archiving block 23. The received frames are stored in the short-term storage area in real time by the short-term storage process of the telemetry archiving block 23 at step 302. At step 303, the telemetry frames, which were maintained for a predetermined time among telemetry frames as stored in the short-term storage area, are retrieved to be stored in the mid-term storage area. The storage of telemetry data into the mid-term storage area is offline processed by the mid-term storage process of the telemetry archiving block. The telemetry frames, which were maintained for a predetermined time among all telemetry frames as stored in the short-term storage area, are copied into the mid-term storage area for subsequent replay at step 304. The telemetry processing block 22 is called to extract important parameters and convert them into values in engineering units for the trend analysis. In the telemetry processing block 22, parameters are extracted from the telemetry frames and converted into values in engineering units for the analysis of trend at step 305. All the parameters extracted from the frames are checked at step 306. The data values of the lastly stored parameters T0, and the extracted data values to be presently processed T1 are obtained, and the reference value of variation Tv for filtering is set at step 307. At step 308, analog and status parameters are extracted. For analog parameters, the data for which the difference (data variation) between the data value of the lastly stored parameters T0, and the extracted data value to be presently processed T1 exceeds a reference value of variation Tv is extracted. For status parameters, only the data of which status has changed is extracted to be transmitted to the mid-term storage process of the telemetry archiving block. The mid-term storage process forms the received parameters into records of a frame which will be stored in the mid-term storage area and modifies data values in a parameter table at step 309. The data in the short-term storage area and remotely sensed frames are deleted at step 310. Finally, a mid-term storage catalog is modified at step 311.

The long-term storage of the telemetry is offline processed by the long-term storage process. All the data, which were maintained for a predetermined time among the data as stored in the mid-term storage area, are retrieved at step 312. The telemetry frames are copied from the mid-term storage area into the long-term storage area at step 313. The analog parameters in engineering units are retrieved to calculate an average value, maximum value, minimum value, and variance of daily data at step 314. The calculated average value, maximum value, minimum value, and variance of parameters are stored in the long-term storage area at step 315. In this way, the data which was stored in the mid-term storage area for a predetermined time allows records to be formed by changing a parameter identification to a key. For status data, the data of which status value has changed is stored. Lastly, the frames and data which were copied into the mid-term storage area are deleted at step 316. The catalogues of the mid-term storage area and the long-term storage area are modified at step 317. With these storage processes, a data storage capacity can be significantly reduced unlike the conventional data storage method which stores all the data. The series of steps for filtering and compressing data are made possible by exploiting the characteristics of the telemetry data values that the telemetry values vary linearly. When data is retrieved, the time for retrieving files can be reduced by storing a catalog, which stores retrieval information on data files, in each storage area. It is preferable to use a device having a small size and short access time for an external storage area. Presently, an optical disc and magnetic tape are used for this purpose.

Figure 4:
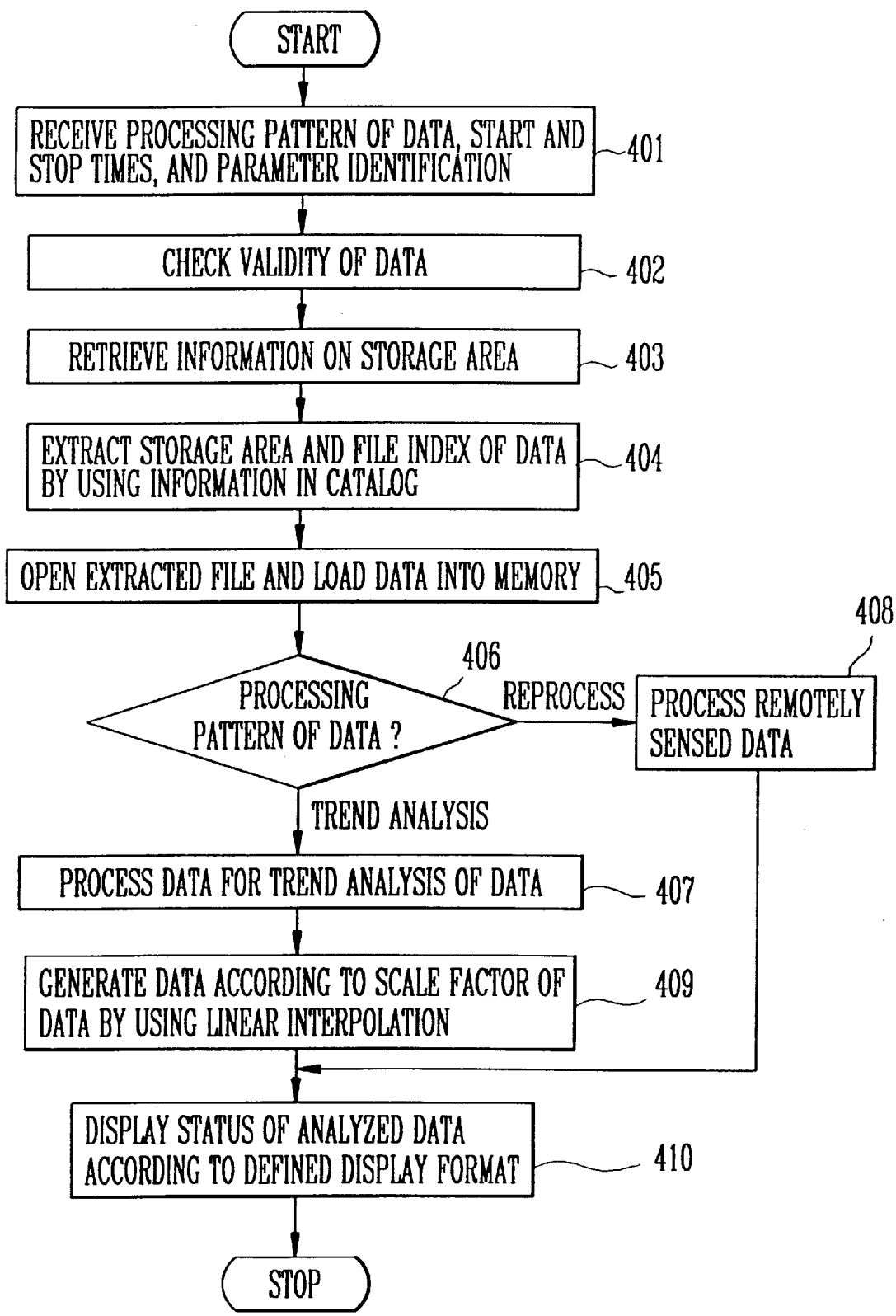
FIG. 4 is a flow chart of the steps for retrieving telemetry data in a satellite control system in accordance with the present invention.

FIG. 4 is a flow chart of the steps for retrieving telemetry in a satellite control system in accordance with the present invention. A retrieval is a process which extracts previously stored telemetry data for the replay or analysis trend of data. When a processing pattern of data within a certain period of time, start and stop time, and a parameter identification to be processed are received from an operator at step 401, the validity of data input from the operator is checked at step 402, and information on where the data to be processed is stored with respect to the start time is retrieved from the information in the catalog at step 403. Specifically, which storage area or file stores the data to be processed is identified. The storage area and file index of data are extracted by using information in the catalog at step 404. In this way, the time for retrieval can be reduced. The memory of the extracted file is opened and data is loaded at step 405. In the case that the data storage area is the long-term storage area, a tape or optical disk is mounted on the driver, and the data file is loaded into the computer. In the case that the data storage area is the short-term or mid-term storage area, data is loaded from the disc or memory of the computer. The steps 404 and 405 are repeated until the time when the retrieved data is stored is the same or greater than the stop time. At step 406, the processing pattern of the loaded data is checked. If it is found that the loaded data is data for trend analysis of data, the data is transmitted to the trend analysis block 28 at step 407. The necessary data values are generated according to the scale factor of the data to be displayed by using a linear interpolation at step 409. The trend of variation of data is displayed as a graph or chart. If it is found at step 406 that the processing pattern is a replay of original data or simple data processing, the loaded data is transmitted to the telemetry processing block at step 408. At step 409, the status of the processed data is displayed according to a defined display format so that the operator can monitor data values together with the status of real time telemetry data and use these data values and status as the data for analyzing the status of a satellite. With this method, all data can be completely recovered.

In accordance with the method for compressing, storing and retrieving telemetry data in a satellite control system of the present invention, the storage capacity of data storage devices can be reduced without the loss of data by filtering the stored data, unlike the conventional method for storing telemetry data. As a result, the time for retrieving stored data for replay can be reduced by 80% compared with the conventional method which stores all data, and the variance of retrieval time can also be reduced.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A method for storing telemetry in a satellite control system, comprising the steps of:

(a) checking frame synchronization and data error of telemetry frames received from a satellite, tagging a time when the telemetry frames were received and transmitting the received telemetry frames to a telemetry archiving block, using a telemetry frame receiving block;

(b) storing in real time the telemetry frames received at the telemetry archiving block into a short-term storage area using a short-term storage process;

(c) retrieving telemetry frames, which were maintained for a predetermined period of time, from the telemetry frames stored in the short-term storage area using a mid-term storage process;

(d) copying the retrieved telemetry frames into a mid-term storage area using the mid-term storage process and calling a telemetry data processing block;

(e) extracting parameters used for trend analysis of data from the copied telemetry frames and converting the extracted parameters into values in engineering units using the telemetry data processing block;

(f) checking the extracted parameters;

(g) obtaining a data value of a lastly stored parameter and an extracted data value to be presently processed in accordance with a result of step (f), and setting a reference value of variation for filtering;

(h) extracting analog and status parameters by comparing the data value of the lastly stored parameter, the extracted data value to be presently processed, and the referenced value of variation for filtering, and transmitting the extracted parameters using the mid-term storage process in the telemetry archiving block;

(i) forming records of a frame from the received extracted parameters, storing the records of a frame in the mid-term storage area, and modifying data values in a parameter table, using the mid-term storage process;

(j) deleting data and telemetry frames stored in the short-term storage area and modifying a catalog in the mid-term storage area, using the mid-term storage process used to modify the data values in the parameter table;

(k) retrieving telemetry frames, which were maintained for a predetermined period of time, from the telemetry frames stored in the mid-term storage area, using a long-term storage process;

(l) copying the retrieved telemetry frames into a long-term storage area;

(m) retrieving analog parameters in engineering units from the copied telemetry frames and calculating an average value, a maximum value, a minimum value and variance of parameters;

(n) storing the calculated average value, maximum value, minimum value and variance of parameters into the long-term storage area; and (o) deleting the telemetry frames and data copied into the mid-term storage area and modifying the catalogues in the mid-term storage area and the long-term storage area using the long-term storage process used to store the calculated values into the long-term storage area.

2. The method in accordance with claim 1, wherein step (i) comprises the step of archiving the analog parameters when a difference between the data value of the lastly stored parameter and the extracted data value to be presently processed exceeds the reference value of variation for filtering.

3. The method in accordance with claim 1, wherein step (i) comprises the step of archiving the status parameters when a status of data has changed.

4. A method for retrieving telemetry in a satellite control center, comprising the steps of:

(a) checking a validity of data input from an operator using a retrieving block which received a processing pattern of data to be processed, start and stop times, and a parameter identification to be processed from the operator;

(b) retrieving information on where the data to be processed is stored with respect to the start time based on information in a catalog, using the retrieving block used to check the validity of the data input from the operator;

(c) extracting a storage area and file index of data based on the information in the catalog;

(d) opening and loading data into the extracted file in memory;

(e) checking a processing pattern of the loaded data, wherein when a result of checking the processing pattern of the loaded data is that the processing pattern is one of a replay of original data and data processing, further comprising the steps of transmitting the loaded data to a telemetry processing block, transmitting the processed data to a satellite status display block, and advancing to step (h);

(f) transmitting data to a trend analysis processing block when a result of step (e) is that the loaded data is trend analysis data;

(g) generating necessary data values according to a scale factor of data to be displayed using linear interpolation and transmitting the necessary data values to the satellite status display block, using the trend analysis processing block which received the trend analysis data; and (h) displaying a status of the analyzed data according to a defined display pattern at the satellite status display block which received the processed data.

5. The method in accordance with claim 4, wherein step (d) comprises the step of mounting one of a tape and optical disk on a driver when the storage area is a long-term storage area, and loading data from one of a disk or memory of a computer when the storage area is one of a short-term or a mid-range storage area.

6. The method in accordance with claim 4, wherein steps (d) and (e) are repeated until a time in which the retrieved data stored is greater than or equal to the stop time.

* * * * *